Dec. 11, 1945. R. L. PELLAND, JR 2,390,896
TORCH HOLDING AND ADJUSTING DEVICE
Filed April 28, 1943 2 Sheets-Sheet 1
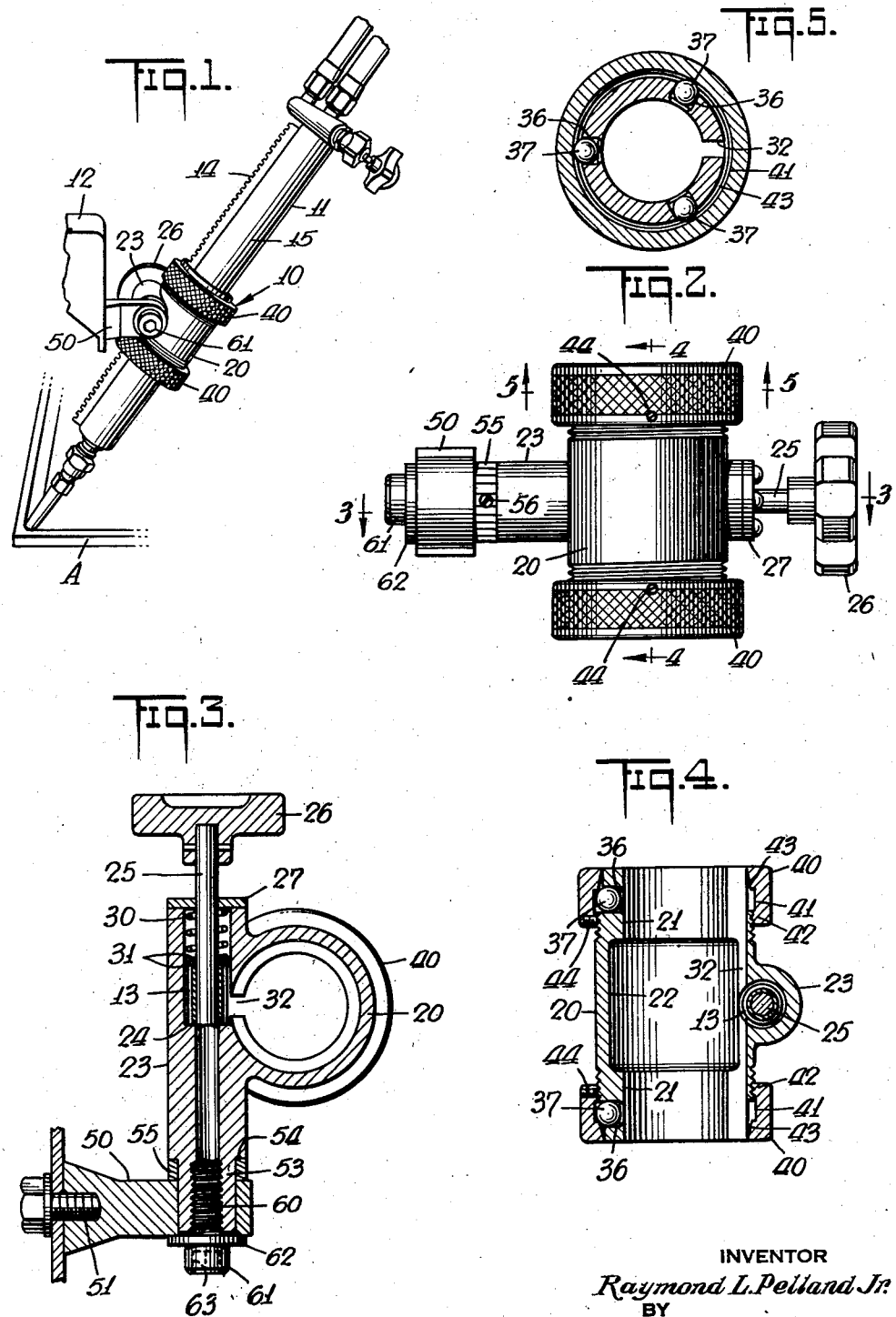
INVENTOR
Raymond L. Pelland Jr.
BY
ATTORNEYS

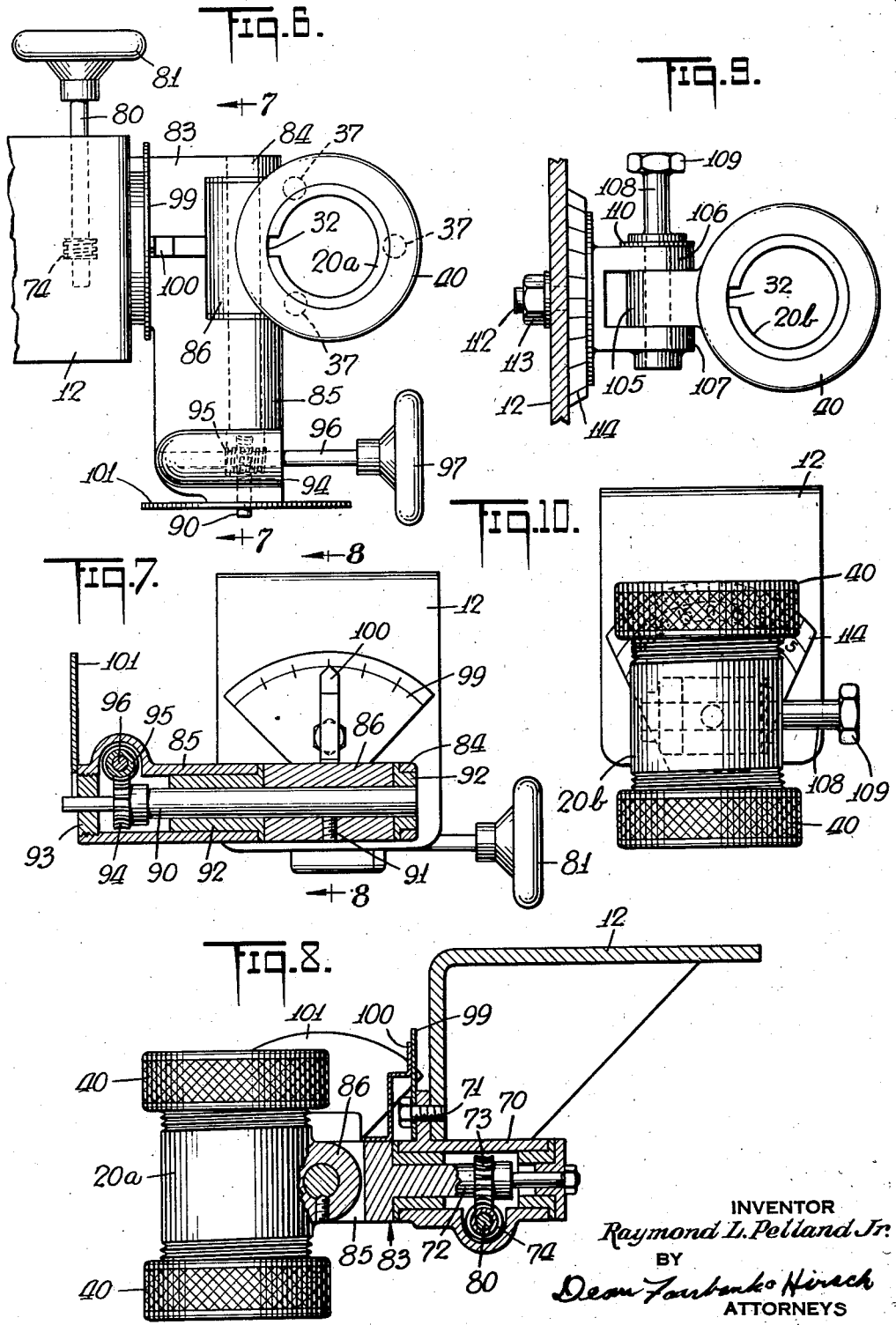

Patented Dec. 11, 1945

2,390,896

UNITED STATES PATENT OFFICE 2,390,896

TORCH HOLDING AND ADJUSTING DEVICE

Raymond L. Pelland, Jr., Chicago, Ill., assignor to National Cylinder Gas Company, Chicago, Ill., a corporation of Delaware Application April 28, 1943, Serial No. 484,873

6 Claims. (Cl. 248—286)

In torch cutting machines it is often necessary to adjust the spacing of the torch with respect to the work for different cutting operations. Any jiggling of the torch due to a loose clamp, or any excessive resistance offered to torch adjustment resulting from a tight clamp, adversely affects accuracy of adjustment or of cutting. The ordinary sleeve clamp for a torch barrel may be either too tight to permit easy longitudinal adjustment of the torch barrel therein, or too loose and causes undesirable play of the torch barrel therein. Another difficulty is due to the fact that torch barrels vary in diameter, and any particular one may vary in size even within a few inches along the length. Although this variation may be only a few thousandths of an inch, it is enough to cause trouble. It is difficult to obtain minute variations in the internal diameter of the common split clamp by means of the ordinary screw device.

Among the objects of the present invention, is to provide a new and improved torch clamp which can be easily, expeditiously and accurately adjusted to accommodate torch barrels of one diameter, but with wide commercial tolerances.

Another object is to provide a torch clamp having new and improved means for angularly adjusting the torch for bevel cutting.

Various other objects, features and advantages of the invention will be apparent from the following particular description, and from an inspection of the accompanying drawings, in which Fig. 1 shows a portion of a torch cutting machine, having one form of torch clamp embodying the present invention, and angularly adjusted for bevel cutting;

Fig. 2 is a side elevation of the torch clamp;

Figs. 3 and 4 are sections taken on lines 3—3 and 4—4 respectively of Fig. 2;

Fig. 5 is a section taken on line 5—5 of Fig. 2;

Fig. 6 is a top plan view of another form of torch clamp of the present invention;

Fig. 7 is a section taken on line 7—7 of Fig. 6;

Fig. 8 is a section taken on line 8—8 of Fig. 7;

Fig. 9 is a top plan view of still another form of torch clamp; and

Fig. 10 is a side elevation of the torch clamp of Fig. 9.

Referring to Figs. 1 to 5, the clamp for supporting the torch 11, is carried by frame piece 12 which is so mounted on the machine that it may be moved in any direction.

The torch clamp comprises a cylindrical sleeve body 20 having cylindrical bores 21 at its ends larger in diameter than the torch barrel 15 to accommodate it loosely, and having an intermediate bore 22 of still greater diameter. Integral or otherwise rigid with the central part of clamp sleeve 20 is a housing 23 extending axially in a direction at right angles to the axis of the sleeve 20, and in which is a pinion 13 engaging an axially facing shoulder 24 limiting movement of the pinion in one direction. This pinion 13 is connected to a shaft 25 on one end of which a handle 26 is attached. This pinion shaft 25 is journalled in a cover plate 27 secured to one end of the pinion housing 23, and serving as an abutment for one end of a spring 30, the other end of which bears against the pinion 13 through intervening washers 31.

The clamp sleeve 20 is provided with a channel 32 extending lengthwise along one side thereof to receive a rack bar 14 on the torch barrel 15 which is in meshing relationship with the pinion 13. As the handle 26 is rotated, the pinion and rack drive adjusts the torch barrel 15 lengthwise in the clamp sleeve 20 and thereby adjusts the spacing of the torch 11 with respect to the workpiece A.

To confine the torch barrel 15 snugly in the clamp sleeve 20, said sleeve has near each end a plurality of torch confining balls 37, each movable radially of the sleeve in a corresponding hole 36 as shown in Fig. 5. The holes 36 at their inner ends may be chamfered or crimped in slightly so as to prevent the balls falling out when the torch is removed from the clamping sleeve.

Means for forcing the balls 37 inwardly into clamping or guiding engagement with the torch barrel comprises a pair of knurled collars 40 each formed on its inner periphery with a circumferential channel 41 into which the balls 37 extend. The inner end 42 of each collar 40 on one side of the channel 41 is threaded on the clamp sleeve 20 inwardly of the ball receiving sockets or holes 36, while its outer end on the other side of said channel presents an internal conical cam surface 43. The balls each have a diameter only slightly greater than the wall thickness of the sleeve, so that when the nuts are loose the balls may not extend at all into the sleeve, and when the nuts are tightened the cams may push the balls in so that they do not project to any substantial extent from the outer surface. As the torch barrel fits the sleeve fairly closely, a very small turn of the nuts is sufficient to clamp or release the torch barrel and prevent or permit adjustment endwise to the desired position.

As each collar 40 moves axially inwardly along the sleeve 20 by rotation thereof, its conical cam surface 43 engaging the balls 37 causes them to move radially inwardly in their respective apertures 36 into clamping or guiding engagement with the torch barrel 15. Rotation of the collars 40 a few degrees moves the balls 37 only a slight distance radially depending on the slope of the cam surfaces 43, thereby affording very gradual adjustment of the balls 37 radially of the sleeve clamp 20 as the collars are rotated. Preferably, the threaded portions have the same pitch of threads so that by simultaneously rotating the collars 40, they are moved towards or away from each other to tighten or loosen both sets of clamping or guiding balls 37 at the same time. The torch clamp 10 can be quickly set and may be used for torch barrels of different diameters within a limited range, and for any adjustment of the balls 37 within this range, the balls at each end of the clamp sleeve 20 will confine the torch barrel centrally of the sleeve.

When it is desired to adjust the torch barrel 15 in the clamp sleeve 20, the pinion handle 26 is rotated to move the torch barrel 15 to the desired longitudinal position in the torch clamp 10.

The collars 40 can be rotated in opposite directions to cause them to move axially outwardly to permit the balls 37 to move radially outwardly, and can be rotated in the other opposite directions to cause said collars to move axially inwardly and thereby move the balls 37 radially inwardly towards the torch barrel. The extent to which the collars 40 are turned depends on the degree of looseness or tightness desired in the torch barrel. The simultaneous opposite turning of the collars 40 as described, does not impose any strain tending to turn the sleeve itself in respect to the other adjusting members to be later described.

Where a rack and pinion drive is provided for the torch barrel, the balls 37 are normally adjusted in position to afford a clamping sleeve 20 having an opening with the necessary working diameter to guide the torch barrel snugly in its adjusting movement lengthwise in said sleeve. Once this adjustment in the position of the balls 37 is made, it need not be disturbed even though the torch barrel is adjusted lengthwise in the clamp sleeve 20.

To lock the collars 40 in adjusted position against possible accidental rotation, set screws 44 may be threaded in these collars to bear against the sleeve 20.

The clamp device shown in Figs. 1 to 4 is constructed and mounted to permit angular adjustment of the torch 11 in two planes substantially at right angles to each other, so that the torch can be used for straight cutting or for simple or compound bevel cutting in the formation of a weld groove, and may be angularly adjusted universally in any direction. For that purpose, the machine frame 12 has secured thereto a bracket 50 by means of a pivot stud 51 threaded into one end of the bracket 50. The other end of the bracket 50 is apertured to receive snugly an axial extension 53 of the pinion housing 23. This extension 53 is of reduced diameter to define an axially facing shoulder 54. An angle indicating ring 55 set against this shoulder 54 is firmly secured to the housing extension by any suitable means, as for example by a set screw 56, and is circumferentially calibrated to indicate the angular position of the axis of the torch with respect to the bracket 50.

A stud 60 is threaded into the housing section 53, and has a turning head 61 at its outer end and a clamping flange 62 adapted to bear against the side of the bracket 50 in tightened position of said stud. This stud head 61 is suitably constructed to permit engagement thereof by a turning tool, and may, for example, be provided for that purpose with a wrench socket 63, or it may have any suitable handle.

By loosening the stud 60, the torch clamp 10 may be angularly moved about the axis of the pinion housing 23 into position to tilt the torch 11 into desired cutting position such as that shown in Fig. 1. In this angular position of the torch 11, the side edge of the workpiece A may be bevelled to form one side of a simple weld groove. If a compound bevel is to be cut on the edge of the workpiece A to form one side of a double V-weld groove, the top bevel is formed with the torch 11 in the approximate angular position shown in Fig. 1, and the bottom bevel is formed with the torch reversed counterclockwise into an angular position about 90° from that shown.

Pivotal adjustment of the torch 11 about the axis of the stud 51 can be effected by loosening said stud and rotating the torch clamp 10 about said axis. By adjusting the torch clamp about this axis, the torch 11 can be made to cut the bevel on an edge at right angles to that above referred to. Any combinations of the two adjustments may be effected.

The torch clamp 10 can be reversibly mounted so that the sleeve 20 is made to extend either on one side of the center line of the machine frame 12, as shown in Fig. 3, or on the other side.

In Figs. 6, 7 and 8 is shown a form of torch clamp provided with micrometer means for angularly adjusting the torch. This torch clamp has a sleeve body 20a similar to the sleeve 20 in the constructions of Figs. 1 to 5, and similarly provided with collars 40 for moving the balls 37 radially inwardly into clamping or guiding engagement with the torch barrel, in the manner already described.

For angularly adjusting the torch in one plane, a gear housing 70 is secured to the machine frame 12 by any suitable means, as for example, a screw 71. Journalled in this gear housing 70 is a shaft 72 carrying a worm wheel 73 meshing with a worm 74 secured to a shaft 80 extending to the outside of the gear housing 70 and carrying at its outer end a suitable turning handle 81.

The shaft 72 has a yoke extension 83 with branches 84 and 85 flanking a tubular knuckle projection 86 on the clamp sleeve 20a to form a knuckle hinge joint between said shaft and said sleeve.

For rotating the torch about the axis of the sleeve knuckle 86, there is provided a worm and worm wheel drive comprising a shaft 90 extending through said knuckle and fixed thereto by any suitable means, as for example the set screw 91. Two bushings 92 secured to the yoke branches 84 and 85, and a collar 93 at the end of the yoke branch 85 serve as bearings for the shaft 90. A worm wheel 94 on the shaft 90 meshes with a worm 95 secured to a shaft 96 carrying at its outer end a handle 97. The yoke branch 85 is hollow to serve as a housing for the gears 94 and 95.

By turning the handle 81, the shaft 72 is rotated through the gear drive 73, 74 to adjust angularly the torch about the axis of said shaft. By turning the handle 97, the shaft 90 is rotated through the gear drive 94, 95 to adjust angularly the torch about the axis of said shaft. The irreversible worm and worm wheel drives for the two pivotal adjustments about axes at right angles to each other lock the torch automatically in adjusted position.

To indicate the angular position of the torch about the axis of the shaft 72, there is provided a sector shaped calibrated dial 99 fixed to gearing housing 70, as for example by the screw 71, and cooperating with a pointer 100 secured to yoke 83.

To indicate the angular position of the torch about the axis of the shaft 90, said shaft carries a calibrated sector shaped dial 101 cooperating with a suitable indicating mark.

The torch clamp of Figs. 6, 7 and 8 may be employed with or without a rack and pinion drive for adjusting the torch lengthwise in the clamp sleeve 20a. If employed without this gear drive, the torch barrel may be moved lengthwise by hand into desired position with respect to the sleeve 20a, and locked in adjusted position by tightening of the collars 40. In that case, the torch barrel would have no rack teeth, so that the channel 32 in the clamping sleeve 20a may be eliminated.

In the case where a rack and pinion drive for adjusting the torch lengthwise in the clamp sleeve 20a is provided, this drive may be depended upon at least partially to hold the torch in adjusted position, while the balls 37 may be adjusted in position to form a snug guide with a slide fit for the torch. In the case where no rack and pinion drive is provided for the torch, the balls 37 provide a quick, positive means enabling the torch to be securely locked against movement. In the latter case, the degree of torch engaging pressure of the balls is greater than is necessary in the case of a torch with a rack and pinion drive.

The torch may be adjusted lengthwise in the torch clamp through a rack and pinion drive, by making the shaft 90 short enough to permit reception of a pinion in the knuckle 86 in mesh with the rack in the torch barrel in a manner similar to that shown in Figs. 1 to 4.

In Figs. 9 and 10 is shown a torch clamp with simple means for angularly adjusting the torch in any direction about two axes substantially at right angles to each other. In this construction, the sleeve clamp 20b similar to the sleeve clamp 20 in the construction of Figs. 1 to 5, has a tubular knuckle projection 105 pivotally retained between the two arms 106 and 107 of a U-shaped bracket. A pivot pin 108 with a handle 109 at its outer end passes loosely through the bracket arm 106 and the knuckle 105, and is threaded in the bracket arm 107. A clamping flange 110 on the pin 108 engages the outer side of the bracket arm 106, and thereby draws the two bracket arms 106 and 107 into clamping engagement with the knuckle 105 as the pivot pin 108 is turned in one direction.

For effecting pivotal adjustment of the torch about an axis at right angles to the axis of the pivot pin 108, there is integral or otherwise rigid with the bracket arms 106 and 107 a pivot screw 112 adapted to pass through the machine frame 12, and having a nut 113 adapted to engage the side of this frame in clamped position of the bracket. A segmental flange 114 forming part of the bracket between its arms 106 and 107, and engaging the machine frame 12, is calibrated to indicate the angle of adjustment of the torch about the axis of the pivot screw 112.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A torch clamping and adjusting device comprising a sleeve adapted to embrace a torch barrel, a plurality of circumferentially spaced torch confining elements carried by said sleeve, and a member for moving said elements into engagement with the torch barrel to center and clamp the latter, said sleeve having rigid with one side thereof a tubular projection extending tangentially therefrom, a support for said sleeve having a lockable hinge connection to said tubular projection with the axis of said hinge extending axially of said tubular projection, and means for mounting said support for pivotal adjusting movement about an axis substantially at right angles to the axis of said hinge connection.

2. A torch clamping and adjusting device having a sleeve adapted to embrace a torch barrel, means for clamping said sleeve to the torch barrel in adjusted position of said torch barrel, a pinion housing rigid with and disposed on one side of said sleeve and extending in a direction substantially at right angles to the axis of said sleeve, a pinion in said housing adapted to mesh with rack teeth on the torch barrel in the hollow of said sleeve, a bracket pivotally supporting said housing for angular adjusting movement about the axis of said pinion, releasable means for locking said housing to said bracket in pivotally adjusted position of said housing, means for supporting said bracket for pivotal adjusting movement about an axis at right angles to said first-mentioned axis, and releasable means for locking said bracket in pivotally adjusted position.

3. A torch clamping and adjusting device having a sleeve adapted to embrace a torch barrel, means for clamping said sleeve to the torch barrel in adjusted position of said torch barrel, a pinion housing rigid with and disposed on one side of said sleeve and extending in a direction substantially at right angles to the axis of said sleeve, a pinion in said housing adapted to mesh with rack teeth of the torch barrel in the hollow of said sleeve, a shaft for said pinion extending through one end of said housing, and a handle secured to said shaft outside of said housing, a bracket having a tubular section at one end embracing the other end of said housing with a fit permitting pivotal movement of the housing about the axis of said pinion, a clamping screw threaded in said other housing end for clamping said housing against pivotal movement in said bracket, and a pivot screw member secured to the other end of said bracket and adapted to fasten said bracket to a frame for pivotal adjusting movement about an axis substantially at right angles to the axis of said tubular section.

4. A torch clamp and adjusting device having a sleeve adapted to embrace a torch barrel and support it for slidable adjusting movement in said sleeve, said sleeve having rigid therewith on one side thereof a tubular projection with its axis substantially at right angles to the axis of said sleeve, a shaft extending in a direction substantially at right angles to the axis of said sleeve, a yoke rigid with said shaft and flanking said tubular projection, whereby upon rotation of said shaft said sleeve is pivotally turned for adjustment about the axis of said shaft, a second shaft extending axially of said tubular projection and secured thereto, whereby upon rotation of said second shaft said sleeve is pivotally turned for adjusting movement about the axis of said second shaft, and micrometer gear drive means for each of said shafts.

5. A torch clamping and adjusting device having a sleeve adapted to embrace a torch barrel and having a tubular knuckle projection with its axis extending substantially at right angles to the axis of said sleeve, a plurality of circumferentially spaced torch confining elements carried by said sleeve, and a member for moving said elements into engagement with the torch barrel, and a bracket having arms flanking said tubular projection, a screw pivot pin through said arms and said tubular projection to form a hinge connection between said sleeve and said bracket, and a pivot screw rigid with said bracket for supporting said bracket for pivotal movement about an axis substantially at right angles to the hinge axis.

6. A clamp including a sleeve having an axial passage therethrough adapted to receive the barrel of a torch, said sleeve having a plurality of holes therethrough adjacent to each end and circumferentially spaced, balls mounted in said holes and of larger diameter than the inner ends of said holes whereby said balls can project to only a limited extent into said passage, nuts threaded on opposite ends of said sleeve and having opposed annular cam surfaces for engaging said balls, the threads having such pitch that the nuts are moved toward each other by rotation in opposite directions, a traveling support, and means carried by said sleeve intermediate of its ends for interlocking engagement with said support.

RAYMOND L. PELLAND, Jr.